(12) United States Patent
Huang et al.

(10) Patent No.: US 12,179,616 B2
(45) Date of Patent: Dec. 31, 2024

(54) VEHICLE ELECTRICAL CONNECTOR

(71) Applicant: ADVANCED-CONNECTEK INC., New Taipei (TW)

(72) Inventors: Sheng-Hsiang Huang, New Taipei (TW); Yu-Feng Ke, New Taipei (TW); Ming-Lung Chien, New Taipei (TW)

(73) Assignee: ADVANCED-CONNECTEK INC., New Taipei (TW)

( * ) Notice: Subject to any disclaimer, the term of this patent is extended or adjusted under 35 U.S.C. 154(b) by 354 days.

(21) Appl. No.: 17/741,357

(22) Filed: May 10, 2022

(65) Prior Publication Data

US 2022/0363150 A1    Nov. 17, 2022

(30) Foreign Application Priority Data

May 11, 2021  (TW) ................................ 110205311

(51) Int. Cl.
```
B60L 53/16      (2019.01)
H01R 13/502     (2006.01)
H01R 13/631     (2006.01)
H01R 13/639     (2006.01)
```
(52) U.S. Cl.
CPC ............ B60L 53/16 (2019.02); H01R 13/502 (2013.01); H01R 13/631 (2013.01); H01R 13/639 (2013.01); H01R 2201/26 (2013.01)

(58) Field of Classification Search
CPC ....... B60L 53/16; H01R 9/0515; H01R 24/50; H01R 13/502; H01R 13/631; H01R 13/639

See application file for complete search history.

(56) References Cited

U.S. PATENT DOCUMENTS

| | | | |
|---|---|---|---|
| 2019/0052012 A1* | 2/2019 | Chen | H01R 13/521 |
| 2019/0211991 A1* | 7/2019 | Lessard | F21S 45/49 |
| 2019/0326713 A1* | 10/2019 | Sauer-Oberschelp | H01R 24/52 |

* cited by examiner

*Primary Examiner* — Tulsidas C Patel
*Assistant Examiner* — Carlos E Lopez-Pagan
(74) *Attorney, Agent, or Firm* — MUNCY, GEISSLER, OLDS & LOWE, P.C.

(57) ABSTRACT

A vehicle electrical connector includes an outer shell, an inner shell, and a conductive assembly. The outer shell includes a groove and assembling channels. The assembling channel extends from an opening on an outer side of the groove toward an inner tubular wall surface of the groove. The inner shell is in the outer shell and includes a base and a casing. The casing extends outward from one side of the base. The inner shell includes buckle blocks outside the casing. The buckle block is guided in the assembling channel through a path of the assembling channel, so that the buckle block is positioned in the assembling channel. Hence, after the inner shell is axially inserted into the outer shell and then rotated into a predetermined position, the inner shell and the outer shell can be stably held with each other.

10 Claims, 7 Drawing Sheets

VEHICLE ELECTRICAL CONNECTOR

CROSS-REFERENCE TO RELATED APPLICATION

This non-provisional application claims priority under 35 U.S.C. § 119(a) to patent Application No. 110205311 in Taiwan, R.O.C. filed on May 11, 2021, the entire contents of which are hereby incorporated by reference.

FIELD OF THE INVENTION

The instant disclosure relates to an electrical connector, especially to a vehicle electrical connector.

BACKGROUND

Electrical connectors are used for conducting power or signals in electrical products, and electrical connectors are widely used for the connection of electronic products. The electrical connectors are also widely used in the circuit systems of automobiles and locomotives and are served as the connection of circuits. Therefore, the electrical connector ensures that the terminals inside the electrical connector can be firmly positioned and locked.

SUMMARY OF THE INVENTION

A plug-type vehicle electrical connector known to the inventor includes an iron shell and a plastic body. The assembling of the connector is often achieved by inserting the iron shell into the plastic body, which is the most convenient way and thus can reduce assembling time and costs. A most common assembling method for the electrical connector is that the iron shell (the inserted component) is provided with hooks or barbs to be connected to the plastic body. However, in the case that the height of the plastic body has to be reduced or the length of the entire electrical connector has to be reduced, the utilization space of the iron shell and the plastic body is restricted, and the iron shell is no longer suitable for configuring with the hooks or the barbs. In another case, after the electrical connector product is combined with the PCB board, the high temperature of the reflow oven will cause the components of the electrical connector to be deformed or to have released stress, resulting in the deformation of the hooks or the barbs on the iron shell. As a result, the original bonding force between the iron shell and the plastic body is reduced or compensated, resulting in the failure of the buckle function.

In view of the above problems, in some embodiments, a vehicle electrical connector is provided and comprises an outer shell, an inner shell, and conductive assembly. The outer shell comprises a groove and a plurality of assembling channels. Each of the assembling channels extends from an opening on an outer side of the groove toward an inner tubular wall surface of the groove. The inner shell comprises a base, a casing, and a through hole. The casing extends outward from one side of the base and is inserted into the groove. The through hole is formed inside the base and the casing. The inner shell comprises a plurality of buckle blocks, each of the buckle blocks is outside the casing, and each of the buckle blocks is guided in each of the assembling channels through a path of a corresponding one of the assembling channels, so that each of the buckle blocks is positioned in the corresponding one of the assembling channels. The conductive assembly comprises a conductive member and an insulated housing. The insulated housing is fitted over the conductive member, and the conductive member and the insulated housing are positioned in the through hole.

In one or some embodiments, each of the assembling channels comprises an axial channel and a rail portion, and the axial channel extends toward an inner side of the groove along the opening of the groove. The rail portion is at an inner side the axial channel, and the rail portion extends circumferentially along the inner tubular wall surface of the groove. Each of the assembling channels has a positioning groove, and the positioning groove is inside the rail portion.

In one or some embodiments, the inner side of each of the axial channels has a first positioning location, and each of the buckle blocks is axially moved to a corresponding one of the first positioning locations along the axial channel. The positioning groove has a second positioning location, and each of the buckle blocks is rotated and moved toward a corresponding one of the second positioning locations along the rail portion, so that each of the buckle blocks is positioned in the corresponding one of the second positioning locations.

In one or some embodiments, a distance between the first positioning location and the opening of the groove is equal to a distance between the second positioning location and the opening of the groove.

In one or some embodiments, each of the rail portions has an inclined portion. Each of the buckle blocks is rotated from the corresponding one of the first positioning locations along the inner tubular wall surface of the groove, elastically contacts a corresponding one of the inclined portions, and is moved toward the corresponding one of the second positioning locations, so that each of the buckle blocks is positioned in the corresponding one of the second positioning locations.

In one or some embodiments, each of the inclined portions has a guiding inclined surface or a plurality of convex portions, and each of the buckle blocks contacts of a corresponding one of the guiding inclined surfaces or the convex portions of a corresponding one of inclined portions in point-contacting or surface-contacting manners, and each of the buckle blocks has a mating inclined surface or a curved surface.

In one or some embodiments, each of the rail portions has a flat surface, and the flat surface of each of the rail portions is inside a corresponding one of the inclined portions and interference contacts a corresponding one of the buckle blocks.

In one or some embodiments, a distance between the flat surface of each of the rail portions and the opening of the groove is greater than a distance between the corresponding one of the second positioning locations and the opening of the groove.

In one or some embodiments, each of the rail portions has a suspension arm and a concave portion, the concave portion is at a side portion of suspension arm, the concave portions provides a space for the suspension arm to swing elastically in the space, and each of the buckle blocks contacts a corresponding one of the suspension arms.

In one or some embodiments, a side portion of the outer shell has a mating block in plate-shaped, and the mating block is connected to the base of the inner shell.

According to one or some embodiments of the instant disclosure, the inner shell is axially inserted into the outer shell and then rotated into a predetermined position, so that each of the buckle blocks of the inner shell can be buckled and positioned inside the corresponding one of the assembling channels of the outer shell. In this way, the inner shell and the outer shell can be stably held with each other. Therefore, upon the connector undergoes the thermal treatment, the buckle block and the assembling channel do not have deformation or stress release issues which may cause the failure of the buckling function between the inner shell and the outer shell. In one or some embodiments, the inner shell and the outer shell are assembled in a rotating manner. Therefore, inner shells with different lengths or widths can be assembled with a single type outer shell. Therefore, by making the length of the width of a single component of the electrical connector fixed, the length of the width of the supporting component connected to the single component can be adjusted, thereby allowing the product to have different dimensional specifications.

Detailed description of the characteristics and the advantages of the instant disclosure are shown in the following embodiments. The technical content and the implementation of the instant disclosure should be readily apparent to any person skilled in the art from the detailed description, and the purposes and the advantages of the instant disclosure should be readily understood by any person skilled in the art with reference to content, claims, and drawings in the instant disclosure.

BRIEF DESCRIPTION OF THE DRAWINGS

The instant disclosure will become more fully understood from the detailed description given herein below for illustration only, and thus not limitative of the instant disclosure, wherein.

DETAILED DESCRIPTION

Figure 1:
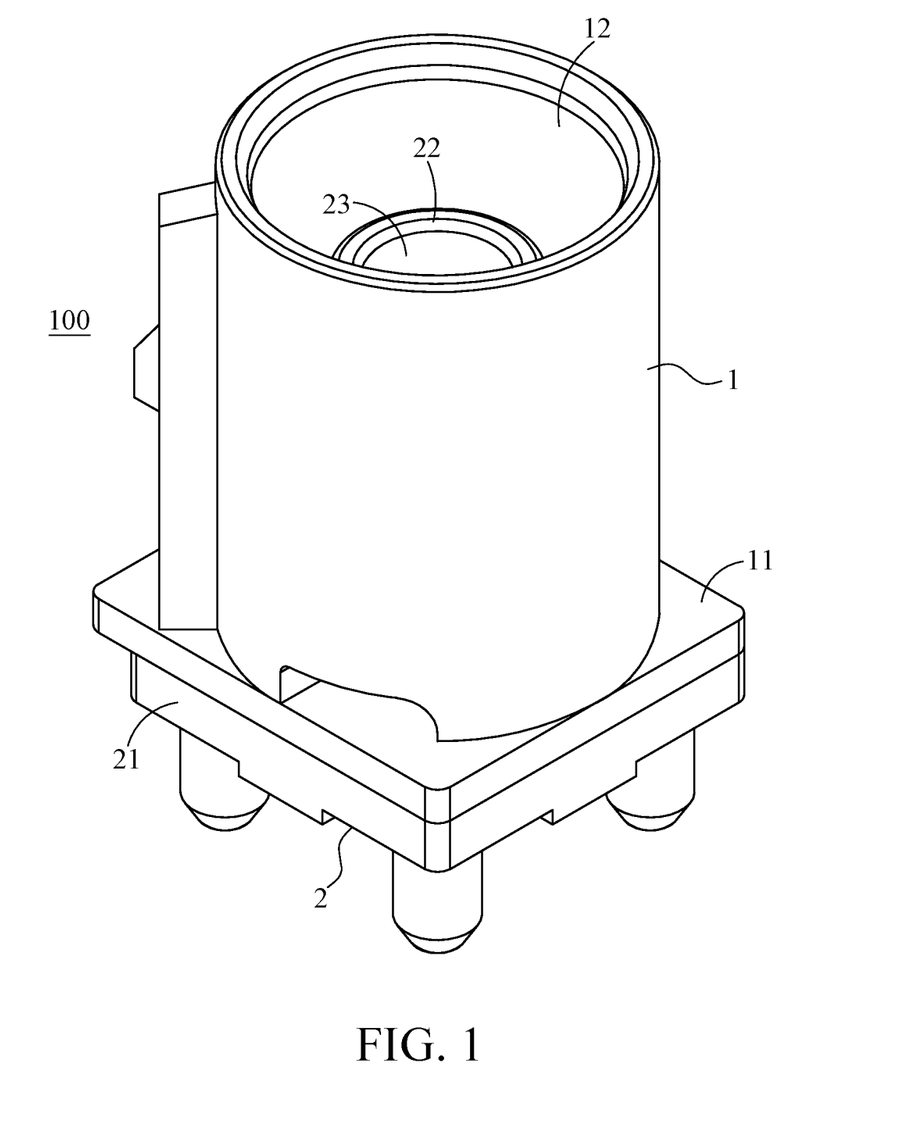
FIG. 1 illustrates a perspective view of a vehicle electrical connector according to one or some embodiments of the instant disclosure.
Figure 2:
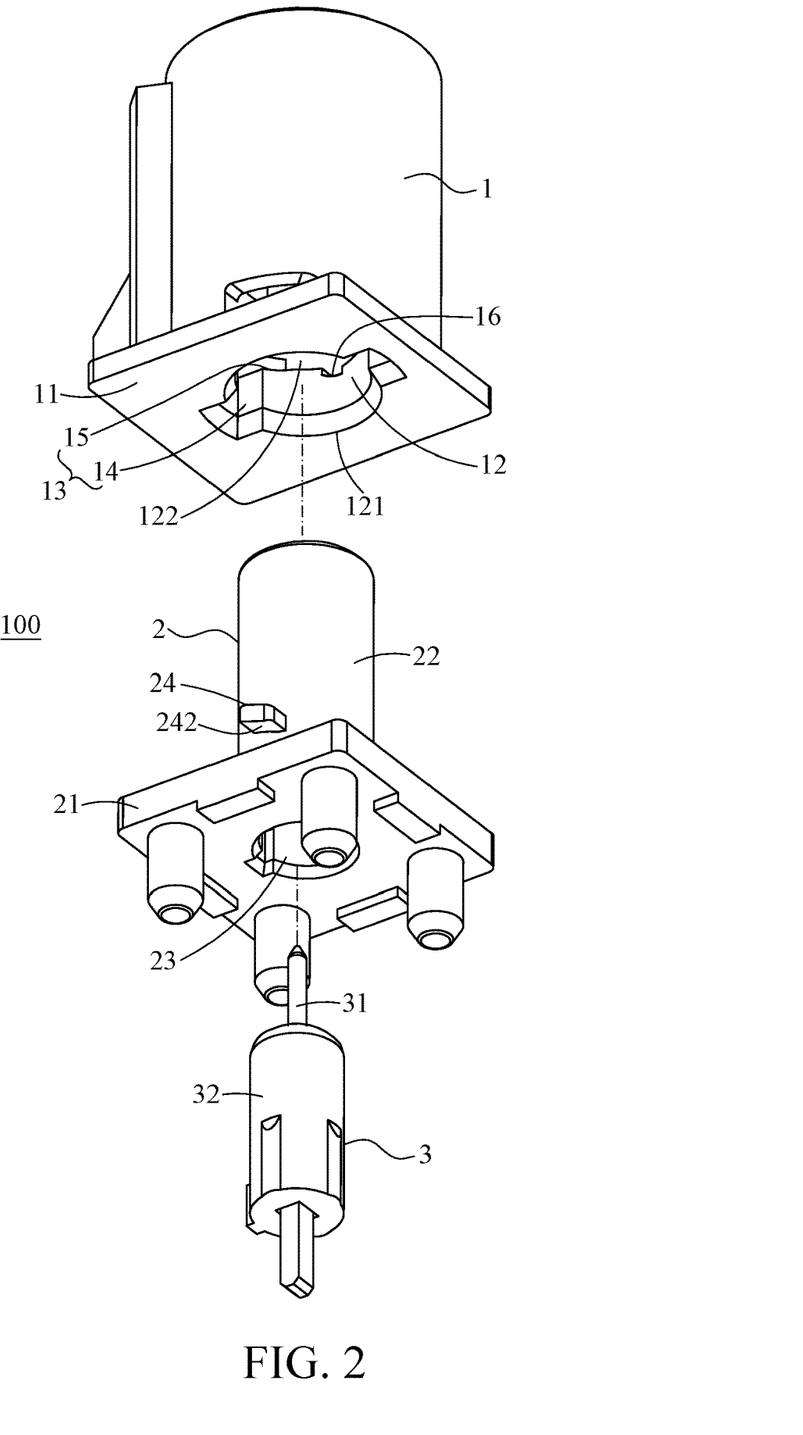
FIG. 2 illustrates an exploded view of the vehicle electrical connector according to one or some embodiments of the instant disclosure.

Please refer to FIG. 1 and FIG. 2. FIG. 1 illustrates a perspective view of a vehicle electrical connector 100. FIG. 2 illustrates an exploded view of the vehicle electrical connector 100. In one or some embodiments, a vehicle electrical connector 100 is plug type connector, the vehicle electrical connector 100 comprising an outer shell 1, an inner shell 2, and conductive assembly 3.

Figure 3:
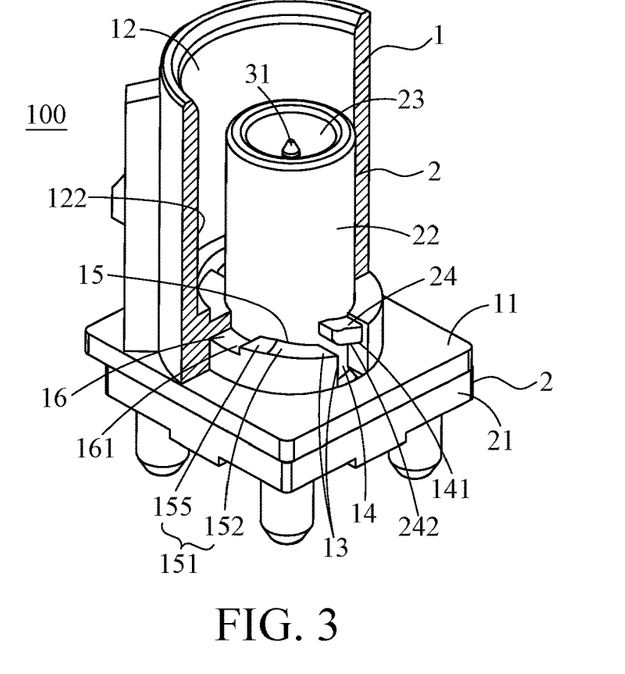
FIG. 3 illustrates a perspective view of the vehicle electrical connector before rotating according to one or some embodiments of the instant disclosure, where an outer shell is illustrated in a half-sectioned configuration.
Figure 4:
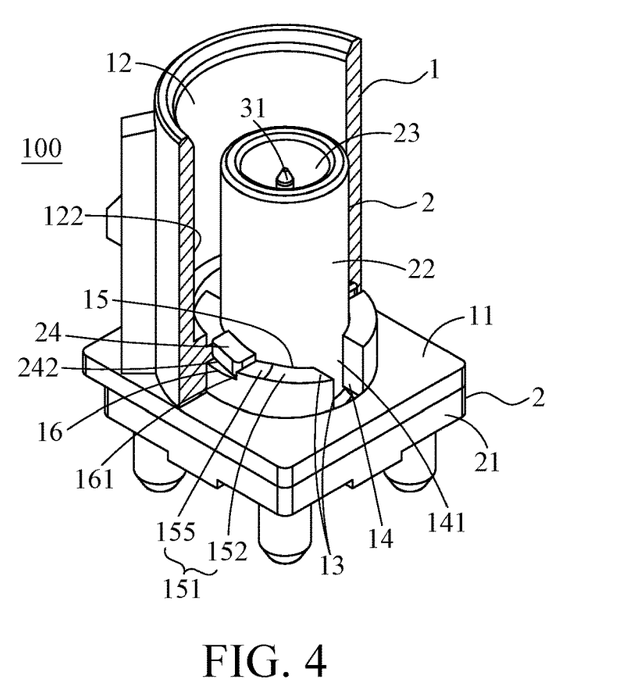
FIG. 4 illustrates a perspective view of the vehicle electrical connector after rotation according to one or some embodiments of the instant disclosure, where the outer shell is illustrated in a half-sectioned configuration.
Figure 5:
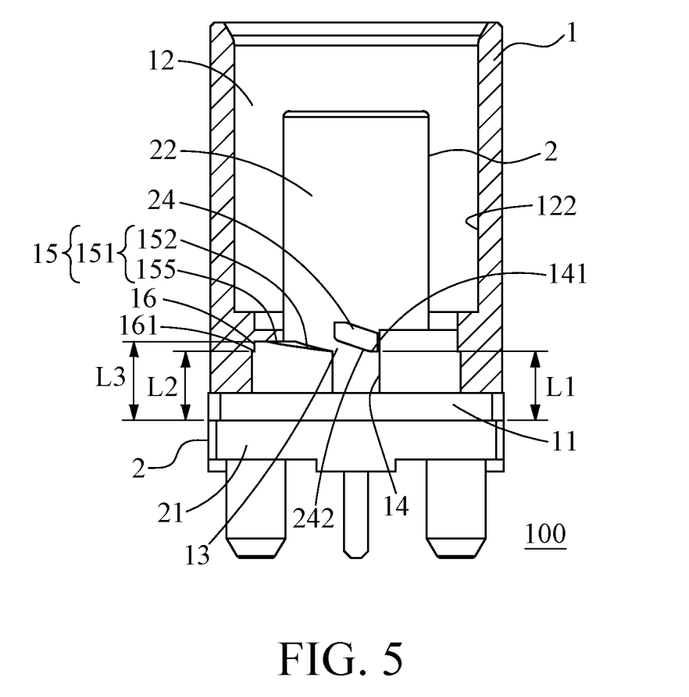
FIG. 5 illustrates a side view of the vehicle electrical connector before rotation according to one or some embodiments of the instant disclosure, where the outer shell is illustrated in a half-sectioned configuration.
Figure 6:
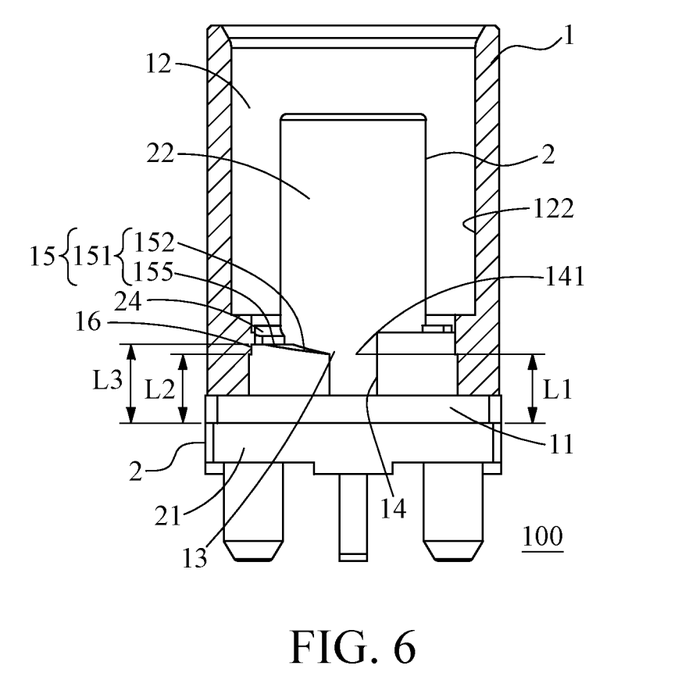
FIG. 6 illustrates a side view of the vehicle electrical connector after rotation according to one or some embodiments of the instant disclosure, where the outer shell is illustrated in a half-sectioned configuration.

Please refer to FIG. 3 to FIG. 6. FIG. 3 illustrates a perspective view of the vehicle electrical connector 100 before rotation. FIG. 4 illustrates a perspective view of the vehicle electrical connector 100 after rotation. FIG. 5 illustrates a side view of the vehicle electrical connector 100 before rotation. FIG. 6 illustrates a side view of the vehicle electrical connector 100. In FIG. 3 to FIG. 6, the outer shell 1 is illustrated in a half-sectioned configuration.

The outer shell 1 comprises a groove 12 and a plurality of assembling channels 13. Each of the assembling channels 13 extends from an opening 121 on an outer side of the groove 12 toward an inner tubular wall surface 122 of the groove 12.

The inner shell 2 comprises a base 21, a casing 22, and a through hole 23. The casing 22 extends outward from one side of the base 21 and is inserted into the groove 12. The through hole 23 is formed inside the base and the casing 22. The inner shell 2 comprises a plurality of buckle blocks 24. Each of the buckle blocks 24 is outside the casing 22, and each of the buckle blocks 24 is guided in each of the assembling channels 13 through a path of a corresponding one of the assembling channels 13, so that each of the buckle blocks 24 is positioned in the corresponding one of the assembling channels 13.

The conductive assembly 3 comprises a conductive member 31 and an insulated housing 32. The insulated housing 32 is fitted over the conductive member 31, and the conductive member 31 and the insulated housing 32 are positioned in the through hole 23.

Figure 7:
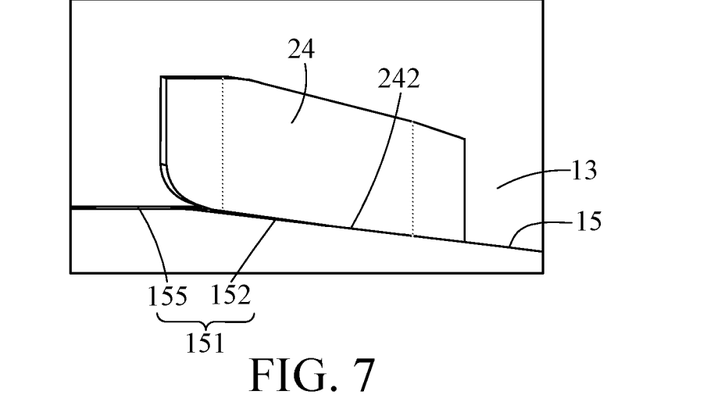
FIG. 7 illustrates an enlarged schematic view showing that a buckle block moves in a path of an assembling channel according to one or some embodiments of the instant disclosure.
Figure 8:
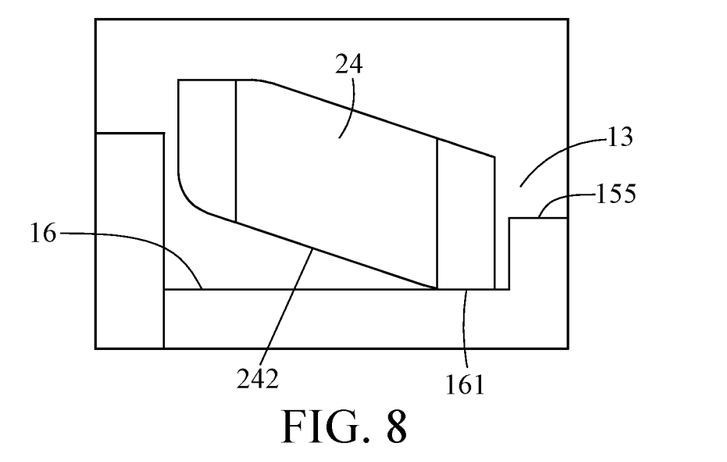
FIG. 8 illustrates an enlarged view showing that the buckle block is positioned in the assembling channel according to one or some embodiments of the instant disclosure.

Please refer to FIG. 3 to FIG. 8. FIG. 7 illustrates an enlarged schematic view showing that a buckle block 24 moves in a path of an assembling channel 13. FIG. 8 illustrates an enlarged view showing that the buckle block 24 is positioned in the assembling channel 13. When assembling the connector, after the inner shell 2 is inserted into the outer shell 1 and the inner shell 2 is rotated to a certain angle, each of the buckle blocks 24 of the inner shell 2 can be buckled and positioned inside the corresponding one of the assembling channels 13. In this way, the inner shell 2 and the outer shell 1 can be stably held with each other.

Figure 11:
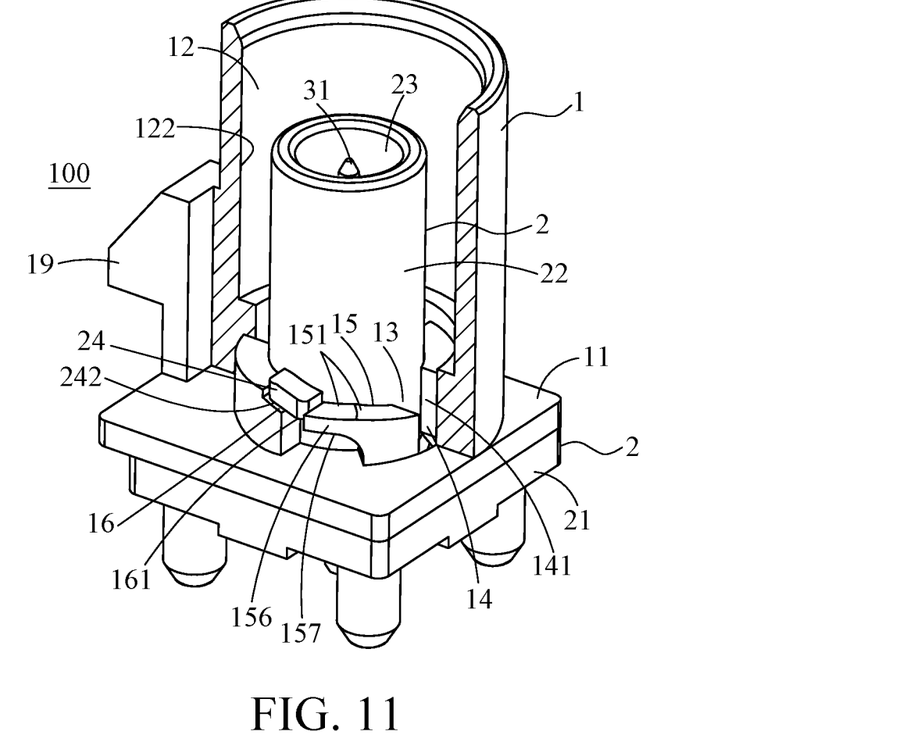
FIG. 11 illustrates a perspective view of the vehicle electrical connector before rotation according to one or some embodiments of the instant disclosure, where an outer shell is illustrated in a half-sectioned configuration; and a rail portion has a suspension arm.

Please refer to FIG. 1 to FIG. 3. In one or some embodiments, the outer shell 1 is a round tubular member, and an outer side of the outer shell 1 has a hook 19 (as shown in FIG. 11) for docking with a receptacle-type vehicle electric connector. A side portion of the outer shell 1 has a mating block 11 in plate-shaped, and the mating block 11 is connected to the base 21 of the inner shell 1. The opening 121 on the outer side of the groove 12 is formed on the surface of the mating block 11. The groove 12 is a circular through hole, and the assembling channel 13 is formed on the wall surface of the circular through hole.

Please refer to FIG. 1 to FIG. 3. In one or some embodiments, the outer shell 1 can be manufactured by a single injection mold, and the mating block 11 is manufactured to have a shorter thickness. Depending on the requirements, the inner shell 2 can be manufactured in a variety of types, for example, the inner shell 2 may have different lengths or heights. The inner shell 2 and the outer shell 1 are assembled with each other in a rotating manner. Therefore, inner shells with different lengths or widths can be assembled with a single type outer shell. Therefore, by making the length of the width of a single component of the electrical connector fixed, the length of the width of the supporting component connected to the single component can be adjusted, thereby allowing the product to have different dimensional specifications. In this way, the mold development costs of the mold of the product can be reduced, thereby allowing the component of the product to be widely applicable to the whole product series and thus reducing the cost for the manufacturing of the products.

Please refer to FIG. 1 to FIG. 3. In one or some embodiments, the inner shell 2 is manufactured by die casting, and the inner shell 2 has a base 21 and a casing 22 integrally formed with each other. The inner shell 2 has a seamless appearance and has a higher structural strength, and the inner shell 2 is not prone to be easily deformed and thus can withstand severe changes in the use environment. The inner shell 2 covers the conductive assembly 3 to reduce external signal interference, and thus can improve the high-frequency characteristics of the product and the appearance quality of the product.

Please refer to FIG. 2 to FIG. 8. In one or some embodiments, each of the assembling channels 13 comprises an axial channel 14 and a rail portion 15, and the axial channel 14 extends toward an inner side of the groove 12 along the opening 121 of the groove 12. The rail portion 15 is at an inner side the axial channel 14, and the rail portion 15 extends circumferentially along the inner tubular wall surface 122 of the groove 12. Each of the assembling channels 13 has a positioning groove 16, and the positioning groove 16 is inside the rail portion 15.

Please refer to FIG. 3 to FIG. 8. In one or some embodiments, the inner side of each of the axial channels 14 has a first positioning location 141, and each of the buckle blocks 24 is axially moved to a corresponding one of the first positioning locations 141 along the axial channel 14. The positioning groove 16 has a second positioning location 161, and each of the buckle blocks 24 is rotated and moved toward a corresponding one of the second positioning locations 161 along the rail portion 15 in a circular motion, so that each of the buckle blocks 24 is positioned in the corresponding one of the second positioning locations 161. When each of buckle blocks 24 is at the corresponding one of the first positioning locations 141, the inner shell 2 has an axial holding direction in the outer shell 1 (the inner shell 2 is axially held in the outer shell 1). When each of buckle blocks 24 is at the corresponding one of the second positioning locations 161, the inner shell 2 has a radial holding direction in the outer shell 1 (the inner shell 2 is radially held in the outer shell 1). In this way, a better locking force can be generated by this configuration, and the locking force does not decrease upon the product undergoes the reflow oven treatments or other high-temperature manufacturing treatments.

Please refer to FIG. 3 to FIG. 8. In one or some embodiments, after the inner shell 2 is installed in the outer shell 1, the inner shell 2 can be buckled and positioned by rotating 90 degrees within the outer shell 1 to complete the assembling of the connector. In one or some embodiments of the instant disclosure, the inner shell 2 does not have the sharp thorn structure to be buckled inside the plastic outer shell 1. Therefore, the stress concentration of sharp thorn structure is not prone to cause the plastic outer shell 1 to rupture, which avoids the failure of the assembling of the connector and reduces the probability of defective products. According to one or some embodiments of the instant disclosure, the assembling of the inner shell 2 and the outer shell 1 is relatively simple without increasing manufacturing costs, thus being capable of reducing the production loss and increasing the production yield.

Please refer to FIG. 2 to FIG. 8. In one or some embodiments, a distance L1 between the first positioning location 141 and the opening 121 of the groove 12 is equal to a distance L2 between the second positioning location 161 and the opening 121 of the groove 12. After each of the buckle blocks 24 is assembled from the corresponding one of the first positioning locations 141 to the corresponding one of the second positioning locations 161, each of the buckle blocks 24 can be stably positioned in the corresponding one of the axial channels 14. The distance L1 is equal to the distance L2, and the bottom of each of the buckle blocks 24 abuts against the bottom of the corresponding one of the positioning grooves 16. Therefore, each of the buckle blocks 24 can be prevented from being unpositioned at the corresponding one of the second positioning locations 161, which may cause the wobbling of the inner shell 2 inside the outer shell 1.

Please refer to FIG. 3 to FIG. 8. In one or some embodiments, each of the rail portions 15 has an inclined portion 151. Each of the buckle blocks 24 is rotated from the corresponding one of the first positioning locations 141 along the inner tubular wall surface 122 of the groove 12. Each of the buckle blocks 24 elastically contacts a corresponding one of the inclined portions 151, and is moved toward the corresponding one of the second positioning locations 161, so that each of the buckle blocks 24 is positioned in the corresponding one of the second positioning locations 161.

Figure 9:
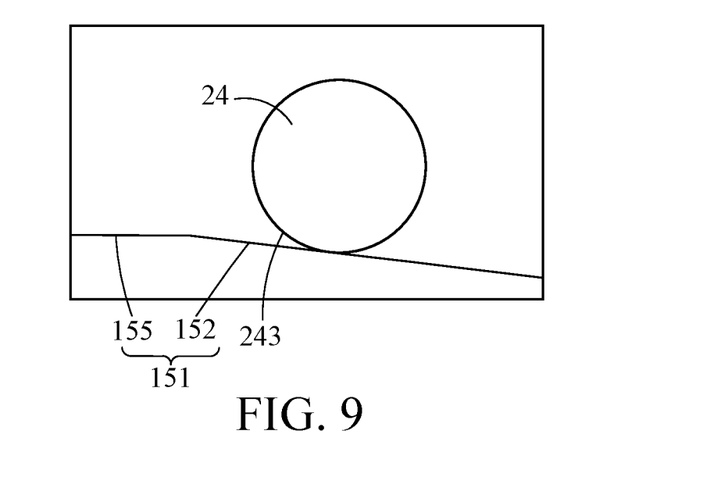
FIG. 9 illustrates an enlarged view showing that the buckle block is a sphere and moves in the path of the assembling channel according to one or some embodiments of the instant disclosure.

In one or some embodiments, each of the buckle blocks 24 has a mating inclined surface 242 or a curved surface 243. Each of the buckle blocks 24 can be a parallelogram structure (as shown in FIG. 8) or a sphere (as shown in FIG. 9).

Figure 10:
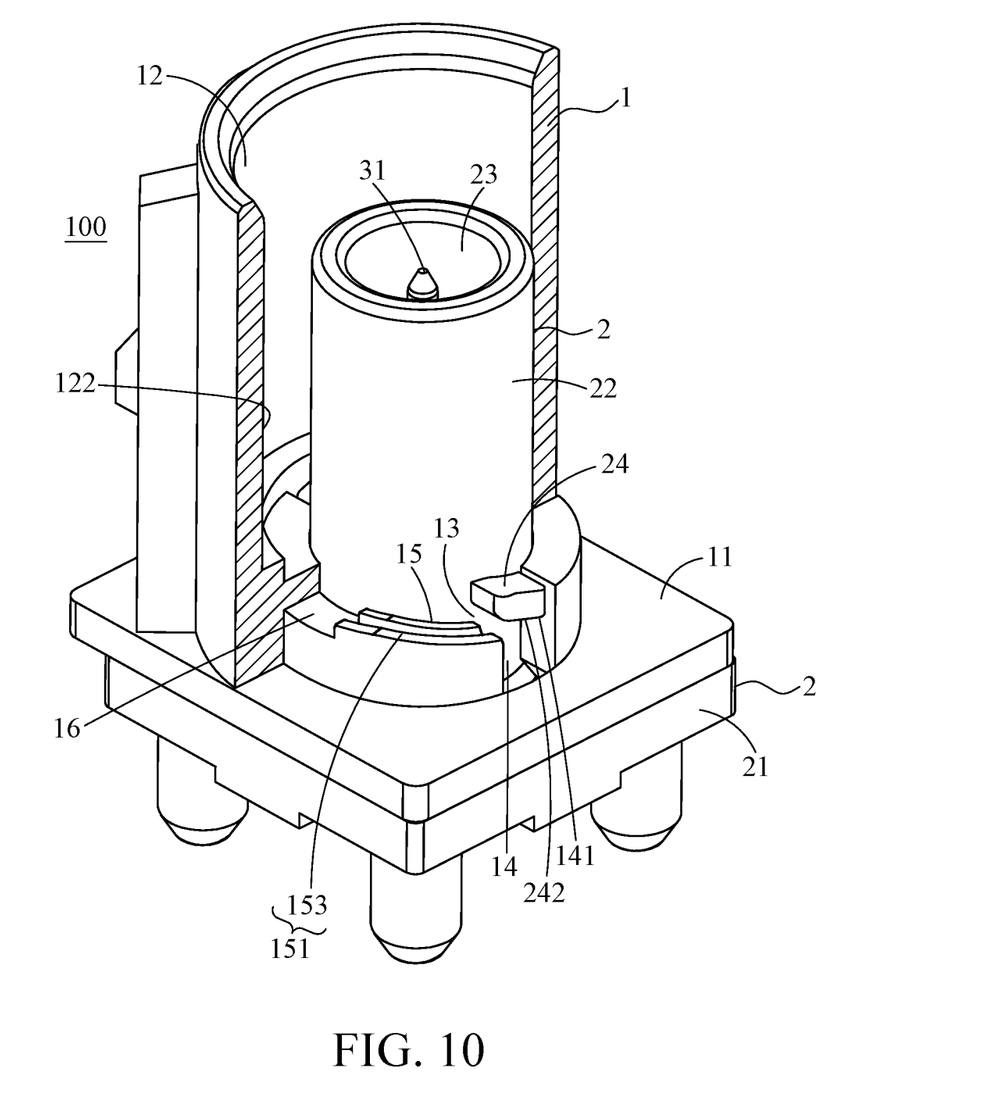
FIG. 10 illustrates a perspective view of the vehicle electrical connector before rotation according to one or some embodiments of the instant disclosure, where an outer shell is illustrated in a half-sectioned configuration; and an inclined portion has a plurality of convex portions.

In one or some embodiments, each of the inclined portions 151 has a guiding inclined surface 152 (as shown in FIG. 7) or a plurality of convex portions 153 (as shown in FIG. 10). Each of the buckle blocks 24 contacts a corresponding one of the guiding inclined surfaces 152 or the plurality of convex portions 153 of a corresponding one of inclined portions 151 in point-contacting or surface-contacting manners.

In one or some embodiments, in the case that the buckle block is the parallelogram structure, each of the buckle blocks 24 has a mating inclined surface 242, and the mating inclined surface 242 contacts the corresponding one of the guiding inclined surface 152 or the plurality of convex portions 153 of the corresponding one of inclined portions 151 in a surface-contacting manner. In one or some embodiments, in the case that the buckle block is the sphere structure, each of the buckle blocks 24 has the curved surface 243, and the curved surface 243 contacts the guiding inclined surface 152 or the plurality of convex portions 153 in a point-contacting manner.

Please refer to FIG. 3 to FIG. 8. In one or some embodiments, each of the rail portions 15 has a flat surface 155. The flat surface 155 of each of the rail portions 15 is inside a corresponding one of the inclined portions 151, and each of the flat surfaces 155 and the corresponding one of the buckle blocks 24 are interference fit. After each of the buckle blocks 24 is rotated and connected to the corresponding one of the guiding inclined surfaces 152 of the inclined portion 151, each of the buckle blocks 24 can be kept rotated. Due that each of the buckle blocks 24 and the corresponding one of the flat surfaces 155 are interference fit, by continuously rotating each of the buckle blocks 24, each of the buckle blocks 24 rubs the corresponding one of the flat surfaces 155 and elastically buckled into the corresponding one of the positioning grooves 16.

Please refer to FIG. 2 to FIG. 8. In one or some embodiments, a distance L3 between the flat surface 155 of each of the rail portions 15 and the opening 121 of the groove 12 is greater than the distance L2 between the corresponding one of the second positioning locations 161 and the opening 121 of the groove 12.

Figure 12:
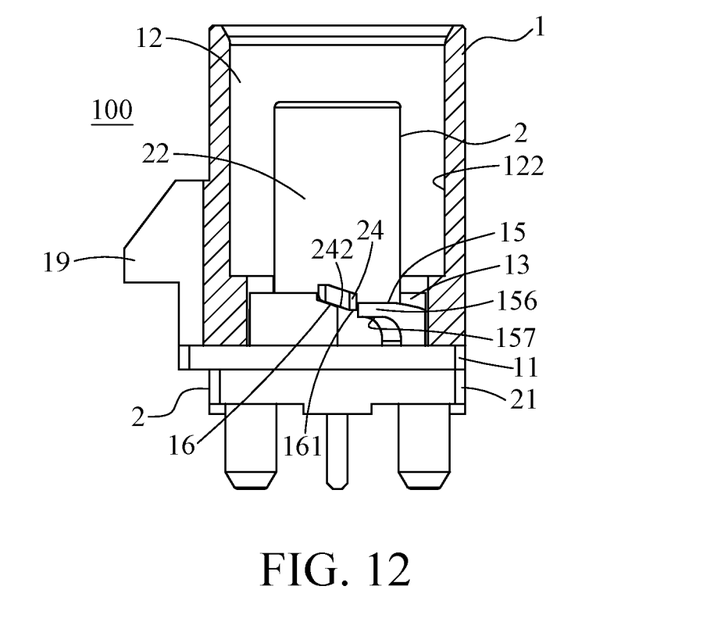
FIG. 12 illustrates a side view of the vehicle electrical connector after rotation according to one or some embodiments of the instant disclosure, where an outer shell is illustrated in a half-sectioned configuration; and the rail portion has the suspension arm.

Please refer to FIG. 11 to FIG. 12. FIG. 11 illustrates a perspective view of the vehicle electrical connector 100 before rotation, and the rail portion 15 has a suspension arm 156. FIG. 12 illustrates a side view of the vehicle electrical connector 100 after rotation. In FIG. 11 and FIG. 12, the outer shell 1 is illustrated in a half-sectioned configuration. In one or some embodiments, each of the rail portions 15 has a suspension arm 156 and a concave portion 157, the concave portion 157 is at a side portion of suspension arm 156, the concave portions 156 provides a space for the suspension arm 156 to swing elastically in the space, and each of the buckle blocks 24 contacts a corresponding one of the suspension arms 156. When each of the buckle blocks 24 is rotated and connected the corresponding one of the suspension arms 156, the corresponding one of the suspension arms 156 is pushed and elastically swings toward a corresponding one of the concave portions 157. By continuously rotating each of the buckle blocks 24, each of the buckle blocks 24 rubs the corresponding one of the suspension arms 156 and elastically buckled into the corresponding one of the positioning grooves 16. In this way, the vehicle electrical connector 100 can be assembled conveniently.

Based on the above, in one or some embodiments of the instant disclosure, the inner shell is axially inserted into the outer shell and then rotated into a predetermined position, so that each of the buckle blocks of the inner shell can be buckled and positioned inside the corresponding one of the assembling channels of the outer shell. In this way, the inner shell and the outer shell can be stably held with each other. Therefore, upon the connector undergoes the thermal treatment, the buckle block and the assembling channel do not have deformation or stress release issues which may cause the failure of the buckling function between the inner shell and the outer shell. In one or some embodiments, the inner shell and the outer shell are assembled in a rotating manner. Therefore, the inner shells with different lengths or widths can be assembled with a single type outer shell. Therefore, by making the length of the width of a single component of the electrical connector fixed, the length of the width of the supporting component connected to the single component can be adjusted, thereby allowing the product to have different dimensional specifications.

While the instant disclosure has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A vehicle electrical connector, comprising:
    an outer shell comprising a groove and a plurality of assembling channels, wherein each of the assembling channels extends from an opening on an outer side of the groove toward an inner tubular wall surface of the groove;
    an inner shell comprising a base, a casing, and a through hole, wherein the casing extends outward from one side of the base and is inserted into the groove; the through hole is formed inside the base and the casing; the inner shell comprises a plurality of buckle blocks, each of the buckle blocks is outside the casing, and each of the buckle blocks is guided in each of the assembling channels through a path of a corresponding one of the assembling channels, so that each of the buckle blocks is positioned in the corresponding one of the assembling channels; and
    a conductive assembly comprising a conductive member and an insulated housing, wherein the insulated housing is fitted over the conductive member, and the conductive member and the insulated housing are positioned in the through hole.

2. The vehicle electrical connector according to claim 1, wherein each of the assembling channels comprises an axial channel and a rail portion, and the axial channel extends toward an inner side of the groove along the opening of the groove; the rail portion is at an inner side the axial channel, and the rail portion extends circumferentially along the inner tubular wall surface of the groove; each of the assembling channels has a positioning groove, and the positioning groove is inside the rail portion.

3. The vehicle electrical connector according to claim 2, wherein the inner side of each of the axial channels has a first positioning location, and each of the buckle blocks is axially moved to a corresponding one of the first positioning locations along the axial channel; the positioning groove has a second positioning location, and each of the buckle blocks is rotated and moved toward a corresponding one of the second positioning locations along the rail portion, so that each of the buckle blocks is positioned in the corresponding one of the second positioning locations.

4. The vehicle electrical connector according to claim 3, wherein a distance between the first positioning location and the opening of the groove is equal to a distance between the second positioning location and the opening of the groove.

5. The vehicle electrical connector according to claim 3, wherein each of the rail portions has an inclined portion; each of the buckle blocks is rotated from the corresponding one of the first positioning locations along the inner tubular wall surface of the groove, elastically contacts a corresponding one of the inclined portions, and is moved toward the corresponding one of the second positioning locations, so that each of the buckle blocks is positioned in the corresponding one of the second positioning locations.

6. The vehicle electrical connector according to claim 5, wherein each of the inclined portions has a guiding inclined surface or a plurality of convex portions, and each of the buckle blocks contacts a corresponding one of the guiding inclined surfaces or the plurality of convex portions of a corresponding one of inclined portions in point-contacting or surface-contacting manners, and each of the buckle blocks has a mating inclined surface or a curved surface.

7. The vehicle electrical connector according to claim 5, wherein each of the rail portions has a flat surface, and the flat surface of each of the rail portions is inside a corresponding one of the inclined portions and interference contacts a corresponding one of the buckle blocks.

8. The vehicle electrical connector according to claim 7, wherein a distance between the flat surface of each of the rail portions and the opening of the groove is greater than a distance between the corresponding one of the second positioning locations and the opening of the groove.

9. The vehicle electrical connector according to claim 3, wherein each of the rail portions has a suspension arm and a concave portion, the concave portion is at a side portion of suspension arm, the concave portions provides a space for the suspension arm to swing elastically in the space, and each of the buckle blocks contacts a corresponding one of the suspension arms.

10. The vehicle electrical connector according to claim 1, wherein a side portion of the outer shell has a mating block in plate-shaped, and the mating block is connected to the base of the inner shell.

\* \* \* \* \*